INVENTORS
BRUCE E. KURTZ
ALAN G. FOLLOWS
WINSLOW H. HARTFORD
BY
*Gerard P. Rooney*
ATTORNEY

3,557,231
PRODUCTION OF CHLOROMETHANES
Bruce E. Kurtz, Marcellus, Alan G. Follows, Camillus, and Winslow H. Hartford, Fayetteville, N.Y., assignors to Allied Chemical Corporation, New York, N.Y., a corporation of New York
Filed May 5, 1969, Ser. No. 821,749
Int. Cl. C07c 17/00
U.S. Cl. 260—657                                                                           4 Claims

ABSTRACT OF THE DISCLOSURE

This invention relates to the preparation of chloromethanes from methyl chloromethyl ether by reacting at elevated temperatures methyl chloromethyl ether with hydrogen chloride in the presence of an ether-cleaving agent comprising sulfur trioxide dissolved in sulfuric acid, and preferably having dissolved therein a minor amount of mercury. The methyl chloromethyl ether is prepared by reacting essentially equimolar proportions of methyl alcohol and formaldehyde and contacting this mixture in countercurrent relationship with hydrogen chloride in a reaction vessel at elevated temperatures.

---

This invention relates to the preparation of chloromethanes from methyl chloromethyl ether. Specifically, the present invention relates to the preparation of methyl chloride and methylene chloride from methyl chloromethyl ether. A further aspect of the present invention relates to an integrated process for the preparation of chloromethanes from methanol and formaldehyde.

It is well known to produce the chlorides of methane, such as methyl chloride, methylene chloride, chloroform and carbon tetrachloride, by chlorinating methane or methyl chloride or mixtures of these compounds. Generally, the reaction involves a substitution of chlorine for hydrogen in the methane or methyl chloride molecule with the formation of the chlorides of methane along with the simultaneous production of hydrogen chloride in an amount equivalent to about half the chlorine supplied to the process. It is evident that an undesirable feature of the known process is the simultaneous production of the relatively worthless compound HCl, which often has little or no value and may even incur an economic penalty in the form of the disposal costs, involving elaborate equipment required in the hydrogen chloride recovery system.

It is also well known in the art to produce methyl chloride by reacting methanol and hydrogen chloride. Inasmuch as hydrogen chloride is consumed in this process, the foregoing processes can be combined in such a manner as to produce methyl chloride without by-product hydrogen chloride. This combination process consisting of the combination of thermal chlorination of methane and/or methyl chloride with hydrogen chloride and the hydrochlorination of methanol employing the hydrogen chloride by-product from the chlorination.

Alternatively, attempts have been made to prepare chloromethanes from methyl chloromethyl ether by reacting the ether with an excess of hydrogen chloride to form methyl chloride and methylene chloride. However, the addition of an excess of hydrogen chloride combined with a long retention time, which is required, produces only small yields of methyl chloride and methylene chloride.

It has now been found that methyl chloromethyl ether may be reacted with hydrogen chloride to produce quantitative yields of methyl chloride and methylene chloride by employing a catalyst system comprising sulfuric acid containing free sulfur trioxide and preferably having dissolved therein minor amounts of mercury as a promoter. It has been found that by dissolving a minor amount of mercury in sulfuric acid containing about 2% up to about 60%, preferably 10 to 55%, by weight free sulfur trioxide, and contacting methyl chloromethyl ether with hydrogen chloride in the presence of this catalyst system at elevated temperatures, there results an essentially quantitative conversion of the methyl chloromethyl ether to methyl chloride and methylene chloride.

Figure 1:
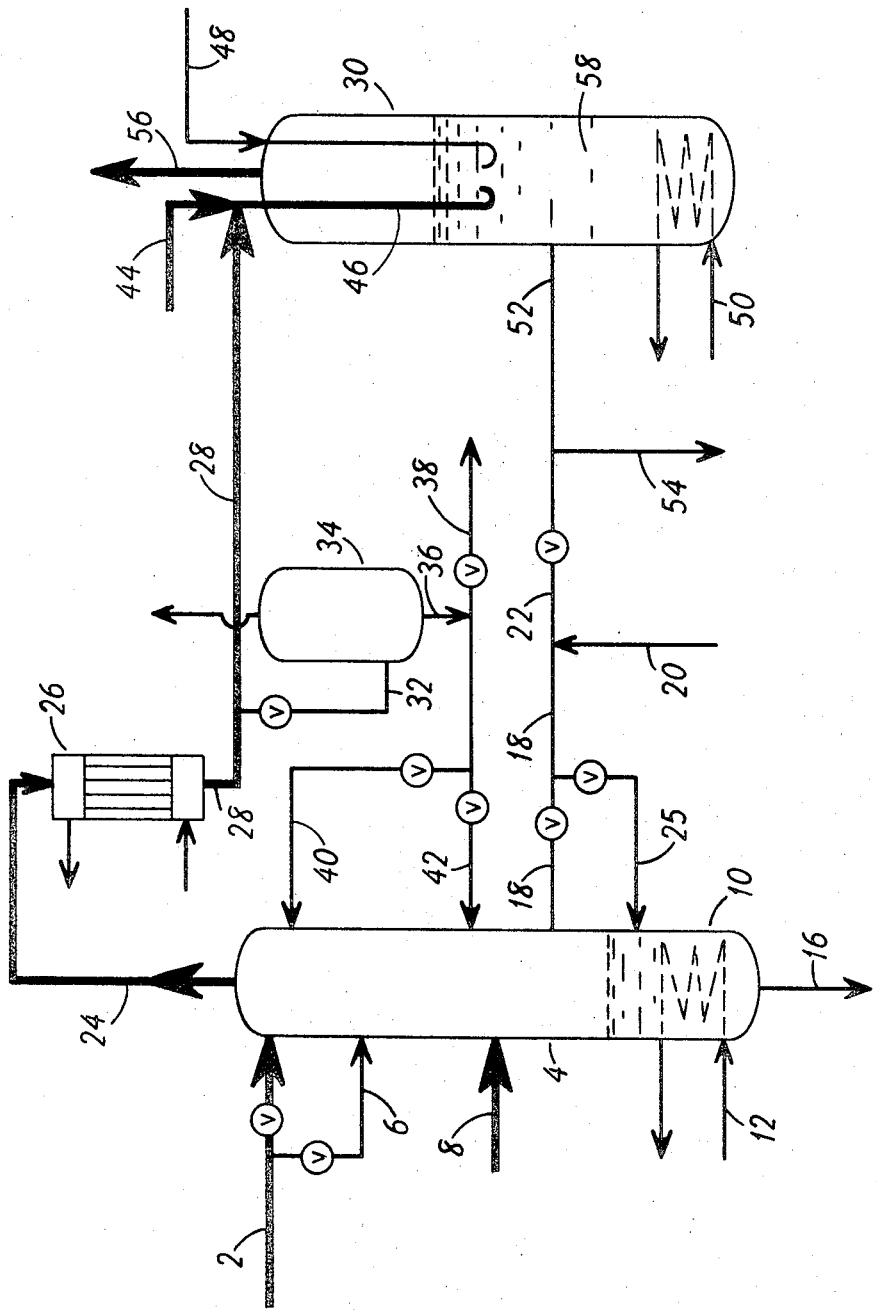
Figure 2:
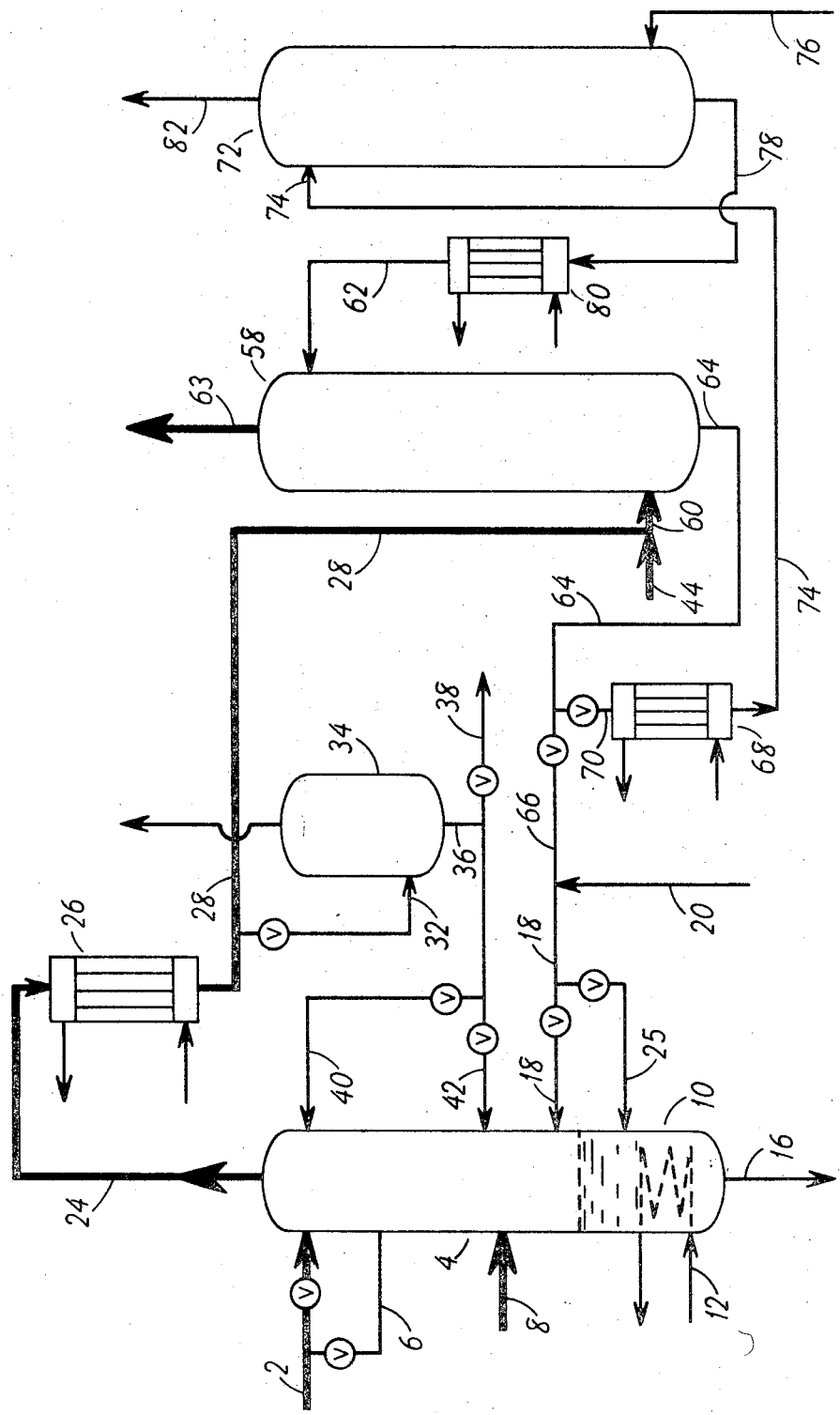

FIGS. 1 and 2 are schematic diagrams of alternative procedures of the process of the present invention.

The methyl chloromethyl ether employed may be prepared by any known method. For instance, hydrogen chloride may be passed into a vessel containing an equimolar mixture of methanol and formaldehyde with or without water until the mixture is saturated with hydrogen chloride and thereafter separating the aqueous and organic layers of the reaction mixture. Methyl chloromethyl ether is then separated from the organic phase. This method, however, has the disadvantage that the yield of methyl chloromethyl ether is lower than that desired in a commercially operable process. A considerable part of the methyl chloromethyl ether produced remains in the aqueous phase which requires distilling the aqueous phase resulting in decomposition of the methyl chloromethyl ether to methanol and formaldehyde, which in turn reacts under the distillation conditions to form methylal, which then has to be recycled to the reactor to reform methyl chloromethyl ether. It has also been suggested to reduce losses of methyl chloromethyl ether in the above process by adding calcium chloride to the reaction mixture thus reducing the solubility of the methyl chloromethyl ether in the aqueous phase. However, this involves the added expense of the cost of the calcium chloride employed.

In the preferred process of the present invention, methyl chloromethyl ether is produced in high yields and good purity by contacting a mixture containing formaldehyde and methanol, preferably in equimolar amounts, with hydrogen chloride in countercurrent relationship to form in a continuous manner methyl chloromethyl ether. This may be readily accomplished, for instance, by introducing a solution of the methanol and formaldehyde at or near the top of a column equipped with suitable contact means, e.g., bubble cap trays, packed columns and the like, to provide for repeated contact of the relatively large amount of liquid with the vaporous hydrogen chloride to insure an efficient contact of the hydrogen chloride as it rises through the reaction vessel. As the reaction mixture of methanol and formaldehyde is contacted with the hydrogen chloride, methyl chloromethyl ether is formed. The methyl chloromethyl ether may be easily separated from the aqueous phase and removed in the overhead fraction while withdrawing excess water from the bottom of the reactor. The methyl chloromethyl ether is in good state of purity for subsequent conversion to methyl chloride and methylene chloride or recovered and and stored for subsequent use.

The reaction vessel is preferably equipped with a reboiler located at the bottom of the reaction column wherein the reboiler supplies heat to the column and continuously generates a stream of hydrogen chloride, organics and water vapors which pass up the column. By adjusting the boil-up rate properly it is possible to prevent any appreciable amount of methyl chloromethyl ether from leaving the column in a stream drawn from the reboiler. This stream consists of the water formed during the course of the reaction, plus a certain amount of dissolved hydrogen chloride corresponding to a water-hydrogen chloride azeotrope. The loss of hydrogen chloride in this water-hydrogen chloride azeotropic mixture may be minimized by adding to the system minor amounts of sulfuric acid which effectively reduces the hydrogen chloride content of the azeotrope. The sulfuric acid may be that which is produced in the conversion of the methyl chloromethyl ether product to methyl chloride and methylene chloride described below in detail. The amount of sulfuric acid which may be added may vary between 5 to 50%, preferably 10 to 30% by weight of the water-hydrogen chloride employed. This permits an increased hydrogen chloride utilization in the reaction vessel.

The vapors leaving the top of the column will generally be methyl chloromethyl ether containing small amounts of water. The water may be removed by providing at the top of the column a reflux condenser. The liquid reflux can be recycled to the reactor column while removing the stream of essentialy pure methyl chloromethyl ether vapors. The vapors can be introduced directly into the reactor which converts the methyl chloromethyl ether to methyl chloride and methylene chloride or alternatively, the methyl chloromethyl ether may be removed from the system and stored.

The methanol and formaldehyde may be either a mixture or solution of aqueous formaldehyde and methanol, or a solution of formaldehyde in methanol in which the formaldehyde is solubilized by addition of a small amount of acid (e.g., HCl) or base (e.g., NaOH). The aqueous solution of formaldehyde and methanol may be prepared by employing commercially available formaldehyde solutions generally containing about 34% to approximately 37% formaldehyde. The formaldehyde and methanol may be mixed together in equimolar amounts, preferably, however, with a slight stoichiometric excess, i.e., about 5 to 10%, of methanol being present. Alternatively, the solution of formaldehyde and methanol may be prepared by passing formaldehyde vapors into methanol or by dissolving solid paraformaldehyde, polyoxymethylene or trioxymethylene in methanol and then de-polymerizing the formaldehyde source with alkaline depolymerization agent; e.g., sodium hydroxide, potassium hydroxide or the like.

The temperature employed in the reaction zone for preparing methyl chloromethyl ether may vary from about 30° up to about 80° C., preferably 40° to 60° C., for the column overhead temperature and temperatures of about 80° to 150° C., preferably 100° to 120° C. for the reboiler. Pressures in the reaction zone may be either atmospheric or superatmospheric, however, atmospheric pressure is preferred because there is no need for the use of high pressure equipment.

The conversion of methyl chloromethyl ether to methyl chloride and methylene chloride may be conducted either in a vapor or liquid state. However, it is preferred that the methyl chloromethyl ether be in the vapor state. The reaction may be conducted either batchwise or in a continuous manner. In the latter method the methyl chloromethyl ether and the hydrogen chloride are reacted in the presence of the sulfuric acid containing sulfur trioxide, preferably also containing dissolved mercury at a temperature of about 80° to 165° C., preferably about 90° to 155° C., by injecting the methyl chloromethyl ether and hydrogen chloride and preferably sulfur trioxide into the sulfuric acid solution or; alternatively, by passing the methyl chloromethyl ether and hydrogen chloride and sulfur trioxide in the form of a vapor in contact with the sulfuric acid either cocurrently or countercurrently thereto in a suitable reaction tower to effect contact between the reactants and acid catalyst. If temperatures above about 165° C. are employed, oxidation of the methyl chloromethyl ether proceeds to such an extent that the sulfuric acid becomes viscous and a significant portion of the methyl chloromethyl ether is converted to tar. By operating in the range of about 90° to 155° C. the acid remains relatively light colored and non-viscous resulting in negligible losses of methyl chloromethyl ether, particularly when there is a free sulfur trioxide content of 30% or less in the sulfuric acid. As the reaction proceeds, sulfur trioxide is consumed which is replenished by adding additional sulfur trioxide in an amount equal to that consumed. The sulfur trioxide is introduced directly into the sulfuric acid.

While the presence of sulfur trioxide in sulfuric acid alone results in significant yields, i.e., in the order of 20% to 30%, of the desired methyl chloride and methylene chloride, the presence of a minor amount of dissolved, i.e. soluble or dispersible, mercury in the sulfuric acid-sulfur trioxide reaction medium is essential to effect quantitative yields of the methyl chloride and methylene chloride from the methyl chloromethyl ether. The concentration of mercury dissolved in the sulfuric acid may vary over a wide range of limits. The mercury may be present in an amount ranging from about one part per million up to an amount at which the metal is no longer dissolved in the sulfuric acid, i.e. its saturation point, with a practical upper limit being approximately 100,000 parts per million (10% by weight) of metal dissolved in the sulfuric acid. A preferred amount of metal may range from approximately about 10 to 1000 parts per million, with up to about 500 parts per million being an especially preferred amount of mercury dissolved in the sulfuric acid. The mercury may be added to the sulfuric acid in any desirable form. However, it is particularly preferred that the metal be added in the form of its salts which upon mixing with the sulfuric acid permits dissolution of the mercury in the sulfuric acid in the desired amount. Exemplary of suitable mercury salts which may be employed are the acetates, benzoates, bromates, bromides, carbonates, chlorates, chlorides, chromates, formates, iodates, iodides, nitrates, oxalates, sulfates, sulfides and the like.

Theoretically, for cleaving each mole of methyl chloromethyl ether there is required 2 moles of hydrogen chloride and 1 mole of sulfur trioxide. In the practice of the present invention for each mole of methyl chloromethyl ether the hydrogen chloride and sulfur trioxide may be present as follows:

Hydrogen chloride: 2.00 to 2.75, preferably 2.15 to 2.60 moles.

Sulfur trioxide: 1.03 to 2.83, preferably 1.14 to 2.23 moles.

In order to better understand the operation of the present invention reference is made to attached schematic drawings of flow diagrams, designated FIGS. 1 and 2, illustrating alternative procedures for preparing methyl chloride and methylene chloride by the integrated process of the present invention.

In FIG. 1, a mixture comprising approximately equimolar amounts of methanol and formaldehyde is introduced into column 4 via line 2. Column 4 may be any contact chamber equipped with suitable means for repeated contacting of vaporous hydrogen chloride with the liquid formaldehyde-methanol mixture in countercurrent relationship. Optionally, the mixture of methanol and formaldehyde may be introduced into column 4 at a point slightly below the top of the column via line 6. Hydrogen chloride is introduced into colum 4 mid-way between the top and the bottom of column 4. At the bottom of column 4 is provided a reboiler section, 10, which supplies heat to the column, such as by the addition of steam through heat exchange element 12. By adjusting the boil-up rate in the reboiler, it is possible to prevent any significant amount of methyl chloromethyl ether from leaving the column by generating a stream of hydrogen chloride, organics and water vapor which pass up the column. The stream drawn from the reboiler via line 16 comprises essentially the water formed in the course of the reaction, plus a certain amount of dissolved hydrogen chloride corresponding to the composition of the water-hydrogen chloride azeotrope.

The loss of hydrogen chloride by withdrawal of the water-hydrogen chloride azeotrope from the reboiler may be minimized by adding sulfuric acid to the column either via lines 20 and 18 or by lines 20, 18 and 25. Alternatively, the sulfuric acid produced in the conversion of the methyl chloromethyl ether to methyl chloride and methylene chloride may be removed from vessel 30 via line 52 and introduced into column 4 by lines 22 and 18 or by lines 22, 18 and 25.

The vapors leaving the top of column 4 by line 24 comprise predominantly methyl chloromethyl ether containing a small amount of water. This overhead fraction is introduced to a reflux condenser 26, via line 24. The stream of methyl chloromethyl ether leaving reflux condenser 26, can be introduced directly into reactor 30, via line 28 for conversion of the methyl chloromethyl ether to methyl chloride and methylene chloride; alternatively, the stream of methyl chloromethyl ether leaving reflux condenser 26 may be passed by lines 38 and 32 to reflux accumulator 34, wherein a portion or all of the methyl chloromethyl ether stream may be removed from the system via lines 36 and 38. Alternatively the liquid methyl chloromethyl ether may be removed from accumulator 34, via line 36 and introduced into column 4 either by line 40 or 42.

In the preferred embodiment of the present invention the methyl chloromethyl ether vapor removed from the reflux condenser 26, is introduced into reaction vessel 30 for conversion to methyl chloride and methylene chloride. To accomplish this the methyl chloromethyl ether is mixed with at least 2 mols of hydrogen chloride introduced into line 28 via line 44 and this mixture is passed into reaction vessel 30 containing sulfuric acid, preferably having dissolved therein a minor amount of mercury. The mixture of methyl chloromethyl ether and hydrogen chloride is introduced into the vessel by sparger pipe 46 which extends below the level of sulfuric acid in reaction vessel 30. Sulfur trioxide is introduced into reaction vessel 30 by means of sparger pipe 48, at a rate of at least about 1 mol of sulfur trioxide for each mol of methyl chloromethyl ether introduced in the reaction vessel. The reacting gases, i.e. methyl chloromethyl ether, hydrogen chloride and preferably sulfur trioxide should not be mixed until in the presence of the sulfuric acid bath, designated 58. The heat evolved in this reaction may be removed by any cooling means, such as cooling coils 50, to maintain a temperature in the sulfuric acid bath of approximately 80° to 165° C. The methyl chloride and methylene chloride products are removed from reaction vessel 30 via line 56 in the form of vapors from which they may be recovered. Sulfuric acid which is produced during the course of the reaction may be removed through overflow lines 52 and 54. Alternatively, this sulfuric acid may be employed in reactor column 4 to reduce the loss of hydrogen chloride by recycling it to column 4, via lines 52, 22 and 18 or by lines 52, 22, 18 and 25.

An alternative procedure, FIG. 2, is to pass the methyl chloromethyl ether from reflux condenser 26 via line 28 along with hydrogen chloride gas, introduced by line 44, into reaction vessel 58, via line 60. Reaction vessel 58 is suitably equipped for repeated countercurrent contact of the vaporous mixture of methyl chloromethyl ether and hydrogen chloride by the downward flow of sulfuric acid, preferably containing approximately 2% to 60% free sulfur trioxide and dissolved mercury, which is introduced into reaction vessel 58 via line 62. The amount of sulfuric acid introduced is regulated such that there is approximately at least one mole of sulfur trioxide available to react with one mol of the methyl chloromethyl ether. The sulfuric acid, reduced in sulfur trioxide content, leaves reaction tower 58 via line 64. The sulfuric acid may be either passed to column 4 via lines 64, 66 and 18 or by lines 64, 66, 18 and 25. If the sulfuric acid removed from tower 58 is to be recycled to column 4 via lines 64, 66 and 18, the sulfuric acid should be first treated by conventional means for the recovery of any dissolved mercury in the acid.

Alternatively, the sulfuric acid removed from column 58 by line 64 may be passed to heat exchanger 68 via line 70 from which it is passed to tower 72 via line 74 where additional sulfur trioxide introduced into tower 72 via line 76 is added to restore the strength of the sulfuric acid such that the free sulfur trioxide content ranges from about 2% to 60% by weight. The mercury, in the form of a salt, may be introduced into vessel 72, with the sulfur trioxide via line 76. The sulfuric acid containing 2% to 60% by weight sulfur trioxide is passed to tower 58 via lines 78 and 62 and passes through heat exchanger 80. Any inert material accompanying the sulfur trioxide introduced into tower 72 via line 76 may be removed from tower 72 via line 82. Methyl chloride and methylene chloride is removed from reactor 58 as an overhead fraction via line 63.

In order to more fully illustrate the nature of the invention and the manner of practicing the same, the following examples are presented.

Examples 1 and 2 demonstrate the preferred method by which the methyl chloromethyl ether is prepared according to the process of the present invention.

EXAMPLE 1

Into the top of a reactor column containing a plurality of contact trays is introduced an aqueous mixture comprising 30.7 weight percent methanol, 29 weight percent formaldehyde and 40.3 weight percent water at a rate of about 5.2 grams per minute. Hydrogen chloride gas is fed into the reactor below this point at a rate of about 3.1 grams per minute. The temperature at the column overhead is approximately 50° C. and at the column reboiler the temperature is approximately 105° C. Approximately 225 grams per hour of crude methyl chloromethyl ether is collected in the overhead fraction which corresponds to a conversion of 95% based on the methanol, formaldehyde and water introduced into the reaction system. The aqueous stream from the column reboiler analyzes about 20 weight percent hydrogen chloride.

EXAMPLE 2

In an apparatus similar to that employed in Example 1 is introduced at the top of the reactor a feed solution comprising 23.3 weight percent methanol, 22 weight percent formaldehyde, 30.6 weight percent water and 24.1 weight percent sulfuric acid at a rate of approximately 6.8 grams per minute. Hydrogen chloride gas is fed into the reactor below the point at which the feed solution is introduced at a rate of approximately 3.1 grams per minute. The temperature at the column overhead is about 50° C. and at the column reboiler the temperature is about 105° C. The overhead fraction analyzed approximately 225 grams per hour of crude methyl chloromethyl ether which is essentially a 95% conversion to methyl chloromethyl ether based on the feed solution. The aqueous stream removed from the reboiler portion of the reaction column contains approximately 9 weight percent hydrogen chloride. This is equivalent to a 40% reduction in hydrogen chloride losses in the aqueous stream from the column reboiler as compared to the hydrogen chloride loss of Example 1 in which no sulfuric acid was added to the feed.

Example 3 demonstrates the effectiveness of using a sulfuric acid-sulfur trioxide solution, and Example 4 demonstrates the increased effectiveness of the catalyst employed in Example 3 by having dissolved therein minor amounts of mercury, for converting methyl chloromethyl ether to methyl chloride and methylene chloride.

EXAMPLE 3

Into a reactor containing a catalyst comprising 460 grams of 30% fuming sulfuric acid is charged hydrogen chloride gas at a rate of 5.1 grams per minute and crude methyl chloromethyl ether at a rate of 3 grams per minute. The crude methyl chloromethyl ether is analyzed and contains about 70% by weight methyl chloromethyl ether, about 30% by weight methylal and about 0.5% by weight methyl ether. The reaction temperature is maintained at approximately 150° C. The product is removed from the reaction zone and is analyzed after one hour of operation. About 20% of the methyl chloromethyl ether is converted to methyl chloride and methylene chloride. After the second hour of operation, analysis of the product shows that essentially no further conversion of the methyl chloromethyl ether to methyl chloride and methylene chloride has taken place and substantial quantities of bis(chloromethyl)ether are formed. After several more hours of reaction, the reaction medium becomes a tarry mass.

By lowering the temperature to 100° C. to 118° C. about 20% conversion of methyl chloromethyl ether to methyl chloride and methylene chloride is observed after the second hour of reaction. The remainder of the reaction product analyses to be bis(chloromethyl)ether.

EXAMPLE 4

(A) Example 3 is repeated except that the catalyst charged comprises 460 grams of 30% fuming sulfuric acid in which is suspended 50 grams of solid mercuric chloride of which approximately 0.03% mercury is dissolved. The reaction temperature ranges from 120 to 130° C. Analysis of the resulting product shows that essentially quantitative conversion of the methyl chloromethyl ether to methyl chloride and methylene chloride is obtained until the free sulfur trioxide content is exhausted, whereupon the conversion rate drops sharply. The product is collected in a refrigerated receiver at −60° C. and then warmed to room temperature. This allows most of the methyl chloride to distill off. The remaining product analyses (gas chromatography) 89 weight percent methylene chloride, 10 weight percent methyl chloride and 1 weight percent sulfur dioxide.

(B) Example 4(A) is repeated except that 442 grams of 30% fuming sulfuric acid is charged to the reactor and the reaction temperature is varied between 94° and 132° C. The product after warming to room temperature analyses (gas chromatography) 91 weight percent methylene chloride, 7 weight percent methyl chloride and 2 weight percent sulfur dioxide.

(C) Example 4(A) is again repeated except that 441 grams and 30% fuming sulfuric acid is charged to the reactor and the temperature is maintained within the range of about 148° to 162° C. The product after warming to room temperature analyses (gas chromatography) 88 weight percent methylene chloride and 12% by weight methyl chloride.

These examples demonstrate that by employing a reaction medium comprising sulfuric acid containing sulfur trioxide and minor amounts of mercury, quantitative conversion of the methyl chloromethyl ether to methyl chloride and methylene chloride is substantially entirely effected.

What is claimed is:
1. A process for the preparation of chloromethanes which comprises reacting hydrogen chloride and methyl chloromethyl ether in the presence of sulphuric acid, containing between 2 and 60% by weight free sulfur trioxide, and a mercury salt present in an amount sufficient to provide between about one part per million of mercury and 10% by weight of mercury based on the amount of sulphuric acid, said mercury salt being selected from the group consisting of acetates, benzoates, bromates, bromides, carbonates, chlorates, chlorides, chromates, formates, iodates, iodides, nitrates, oxalates, sulfates and sulfides; at a temperature within the range of about 80 to 160° C. to effect conversion of the methyl chloromethyl ether to chloromethanes.

2. The process according to claim 1 wherein said mercury salt is mercuric chloride.

3. The process according to claim 1 wherein the mercury salt is dissolved in the sulfuric acid.

4. The process according to claim 2 wherein the reaction temperature ranges from about 90° to 155° C.

References Cited

UNITED STATES PATENTS 3,067,267 12/1962 Young et al. _____ 260—657
3,360,583 12/1967 Hall et al. _____ 260—657

OTHER REFERENCES

Mellor Comprehensive Treatise on Theoretical and Inorganic Chemistry, vol. 10, pp. 686–687 (1930).

DANIEL D. HORWITZ, Primary Examiner

UNITED STATES PATENT OFFICE
CERTIFICATE OF CORRECTION

Patent No. 3,557,231          Dated January 19, 1971

Inventor(s) Bruce E. Kurtz, Alan G. Follows, Winslow H. Hartf

It is certified that error appears in the above-identified patent and that said Letters Patent are hereby corrected as shown below:

Column 8, line 23, "160°C." should read --165°C.--

Signed and sealed this 15th day of June 1971.

(SEAL)
Attest:

EDWARD M. FLETCHER, JR.          WILLIAM E. SCHUYLE
Attesting Officer          Commissioner of Pa